Nov. 3, 1925.  
J. R. BOW  
1,560,139  
APPARATUS FOR WINDING LONG AND ENDLESS CINEMATOGRAPH FILMS  
Filed Jan. 4, 1922  
4 Sheets-Sheet 1
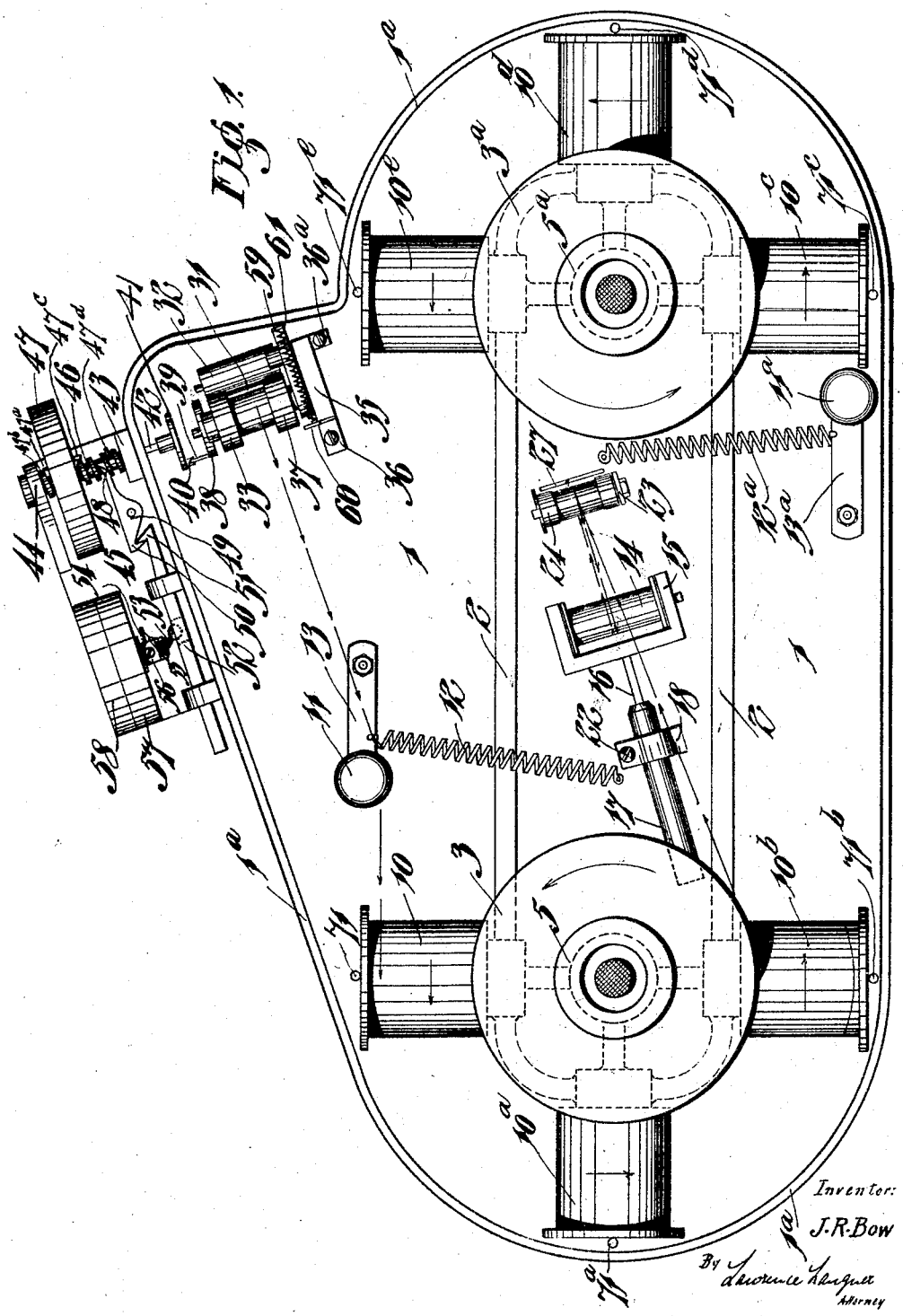
Inventor:  
J. R. Bow

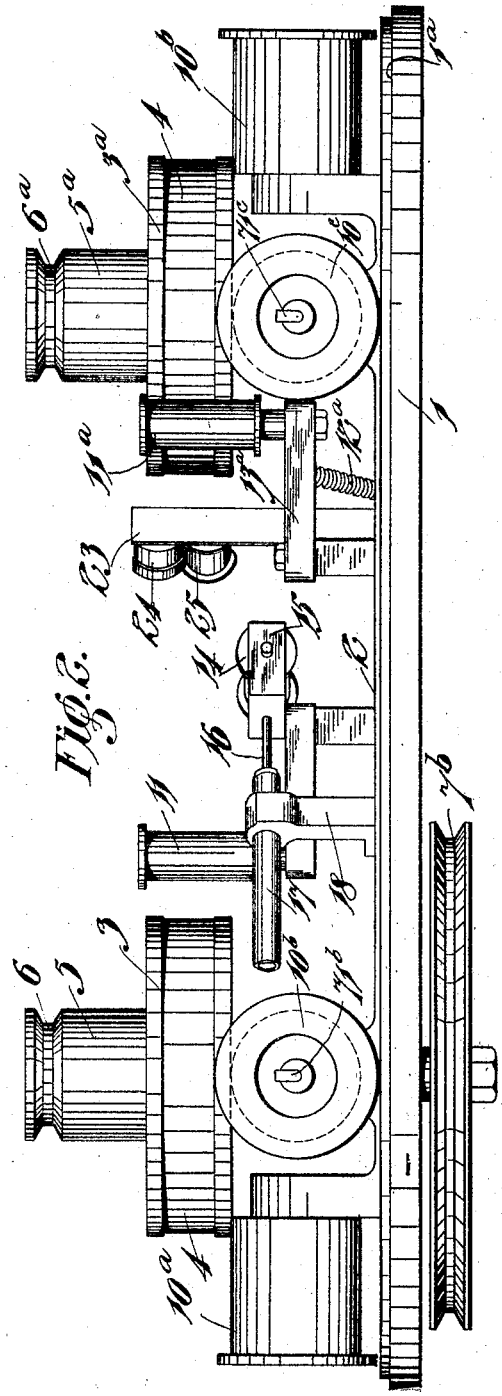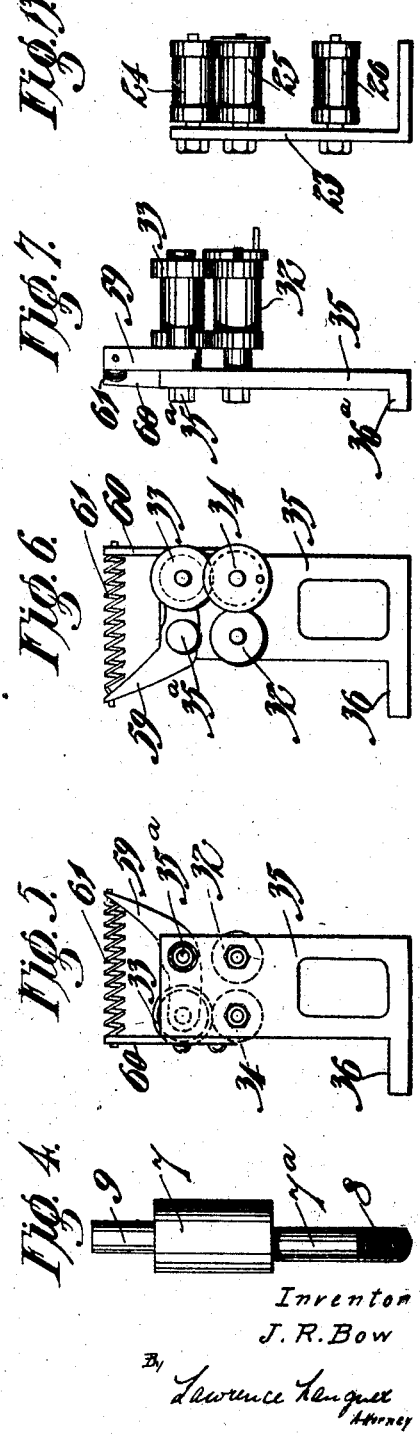

Nov. 3, 1925.  1,560,139
J. R. BOW
APPARATUS FOR WINDING LONG AND ENDLESS CINEMATOGRAPH FILMS
Filed Jan. 4, 1922   4 Sheets-Sheet 3

Inventor:
J. R. Bow
By Lawrence Langner
Attorney

Nov. 3, 1925.
J. R. BOW
1,560,139
APPARATUS FOR WINDING LONG AND ENDLESS CINEMATOGRAPH FILMS
Filed Jan. 4, 1922    4 Sheets-Sheet 4
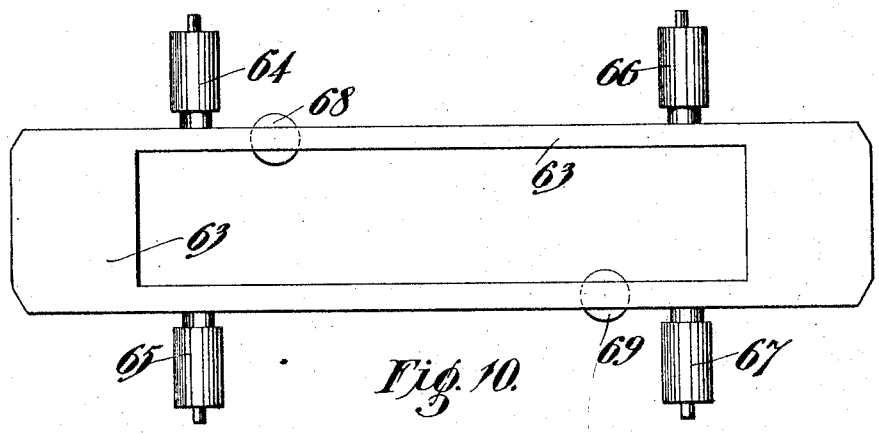
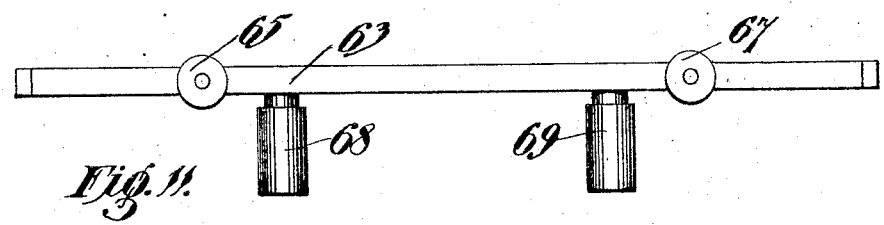
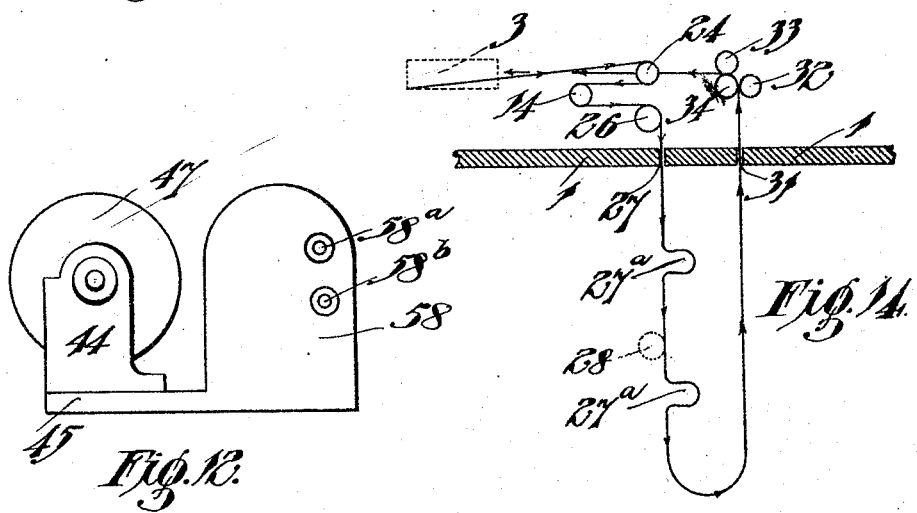
Inventor:
J. R. Bow
By Lawrence Langner
Attorney Patented Nov. 3, 1925.

1,560,139

UNITED STATES PATENT OFFICE.

JOHN ROGER BOW, OF MELBOURNE, VICTORIA, AUSTRALIA.

APPARATUS FOR WINDING LONG AND ENDLESS CINEMATOGRAPH FILMS.

Application filed January 4, 1922. Serial No. 526,982.

*To all whom it may concern:*

Be it known that JOHN ROGER BOW, a citizen of the Commonwealth of Australia, and resident of 224 Queen Street, Melbourne, in the State of Victoria, Commonwealth of Australia, has invented a certain new and useful Improved Apparatus for Winding Long and Endless Cinematograph Films, of which the following is a specification.

This invention relates to an improved apparatus for winding long and endless cinematograph films particularly of the kind used for advertising purposes or where continuous performances are necessary and the object of the invention is to provide means whereby the film is wound continuously to show the same subject any number of times without changing the film.

Now the object of my invention is to provide an apparatus which will successfully deal with and absorb great lengths of film in a convenient, compact and satisfactory manner eliminating all risk of damaging the film through friction or other common causes.

The invention is particularly characterized by the fact that the film is always in sequence the means for obtaining this result being hereinafter described.

The essential characteristics of this invention are substantially as follows:—

1. A base plate having pillars cast thereon to carry drums which are adapted to revolve in the same direction and to engage the surfaces of a plurality of flanged pulleys which are disposed at right angles to the axis of the drums, said drums being spaced a convenient distance apart in the same plane.

2. The provision of grooved vertically disposed members adapted to receive a belt for transmitting movement from the driving drum to the driven drum, the said members being preferably cast integral with the drums.

3. The provision of a flexible roller mounted in such a manner that the axis of said roller is at a right angle to the tangent of said rear driving drum.

4. The provision of a vertically disposed bracket having right-angled spindles thereon to carry rollers which are in line with the flexible roller above-mentioned, the spindles with rollers being disposed at a right angle to the tangent of the rear drum.

5. The provision of pivotally mounted spring controlled jockey pulleys arranged so that a uniform pressure is exerted on the film during its travel, to keep it in position on the drums.

6. The provision of a bracket carrying rollers, the axis of said rollers being at right angles to the bracket the rollers being disposed so that they move at right angles to the flexible roller and the rollers in front thereof the rollers moving at right angles being arranged so that two rollers are placed one above the other and one in front of the lower roller but substantially in the same plane, the upper roller being provided with bands of rubber or other pliable material the lower roller being provided with a flange having a pin thereon to engage a lug on a corresponding flange which is mounted on a spindle supported in brackets or bearings, the spindle being formed with a thread thereon and a pulley formed with a corresponding thread movably mounted on the threaded spindle.

7. The provision of a pivotally mounted barbed member having an extension formed at the opposite end to the barb, the extension being disposed so that it is always substantially over the threaded spindle, the barb being engaged with a corresponding barb formed on a rod provided with a slot to receive a switch arm, so that when the apparatus is in operation the barbs are engaged and as soon as the film breaks or is otherwise damaged the pulley mounted on the threaded spindle moves inwards and engages the extension on the pivotally mounted barbed member and forces it over which immediately disengages the barbs and automatically cuts off the current causing the whole apparatus to cease working.

8. The provision of a detachable frame having vertically and horizontally disposed rollers adapted to be placed over the whole apparatus the vertical rollers being adapted to keep the film in uniformity during its movements, the rollers being arranged so that they come in front of and behind the pivotally mounted and spring controlled rollers, the horizontal rollers being arranged so that they move directly over the main rollers, the object of these rollers being to keep the film from over-riding during its travel.

9. The provision of a flexible member so mounted that it is capable of moving to compensate for the irregularities in the tension of the film.

But in order to more readily understand the invention it will now be described with reference to the accompanying drawings in which:—

Figure 1 is a plan view of apparatus constructed according to this invention.

Figure 2 is a side elevation thereof.

Figure 4 is a plan view of the driving spindle.

Figure 5 is a rear elevation of the bracket and preferred means of mounting the rollers of the return mechanism.

Figure 6 is a front elevation thereof.

Figure 7 is a side elevation thereof.

Figure 10 is a plan view of the frame carrying the rollers to control the film in so far as irregular winding is concerned.

Figure 11 is a side elevation thereof.

Figure 12 is a rear view of the member for carrying the switch and automatic cut-off.

Figure 13 is a front elevation of the rollers in front of the flexible roller, and Figure 14 is a diagrammatic view of the path of the film from the time it leaves the rear drum until it is re-wound on the said drum.

Figure 3:
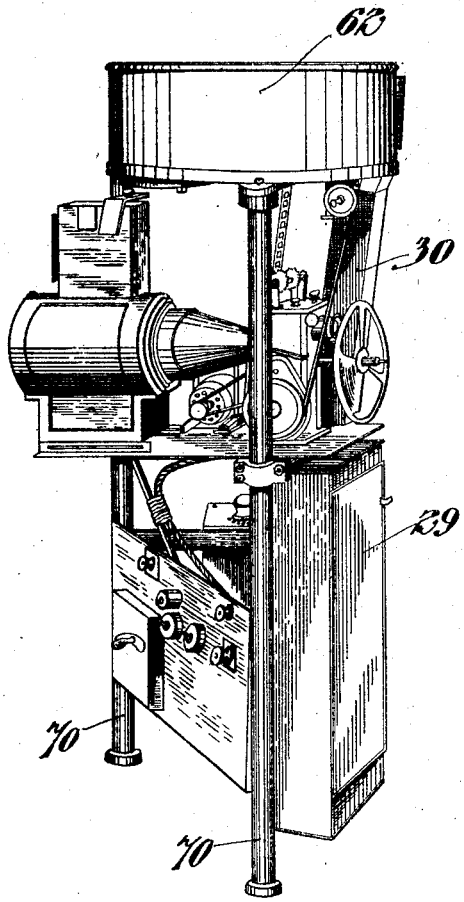
Figure 3 is a perspective view showing the preferred form of mounting the apparatus.
Figure 8:
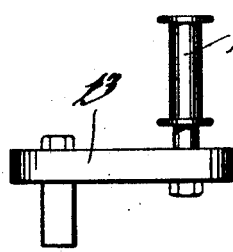
Figure 8 is a side elevation of the pivotally mounted roller.
Figure 9:
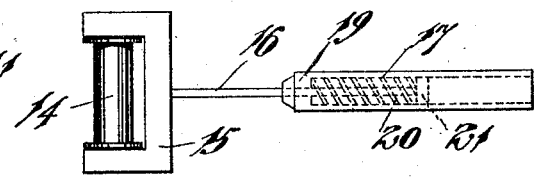
Figure 9 is a plan view of the flexible roller.

According to this invention a base plate 1 is provided having webs 2 cast thereon to impart rigidity to the plate 1.

Mounted on vertical spindles are drums 3 and $3^a$ formed with a central groove 4 thereon the object of the groove being to lessen to a fine degree the possibility of injuring the film during its travel.

Cast integral with the drums 3 and $3^a$ are vertical members 5 and $5^a$ having grooves 6 and $6^a$ thereon to accommodate a belt which is passed around the grooves in the members 5 and $5^a$.

The drum 3 is mounted on a spindle 7 the stem $7^a$ with the threaded portion 8 being out of centre with the upper portion 9 so that the distance between the centres of the drums may be reduced to allow the wound film to be placed belt-wise over the drums without damage and after the film is in position the drum out of centre is adjusted to move on a common centre.

Mounted on the spindle 7 is a grooved driving wheel $7^b$ adapted to engage a belt from any source of power.

Revolubly mounted on the horizontal spindles are flanged pulleys 10, $10^a$, $10^b$, $10^c$, $10^d$, $10^e$ which are arranged so that the under edges of the drums 3 and $3^a$ ride on the surface of the flanged pulleys sufficiently to move same at the speed of the drums and in the same direction, the object of driving the rollers 10, $10^a$, $10^b$, $10^c$, $10^d$, $10^e$, in this manner is to impart a separate drive and uniform speed to each separate convolution of the film.

Arranged in suitable positions on the base plate 1 are pivotally mounted jockey pulleys 11 and $11^a$ which are controlled by springs 12 and $12^a$ secured to the arms 13 and $13^a$ and also to the base plate 1.

The object of these jockey pulleys is to exert an even pressure on the film during its travel and keep it from winding irregularly and also to guide the film to its correct position on the drums.

Mounted on the base plate 1 is a flexible roller 14 supported in a suitable bearing 15, the stem 16 being rigidly fixed to the back of the bearing 15 and passing into a cylinder 17 which is held in a bearing or bracket 18.

The cylinder 17 is hollow and provided with a gland 19 the stem 16 acting as a piston which is adapted to move in the cylinder under control of a spring 20 which is disposed between the head 21 of the stem 16 and the gland 19.

The bearing 18 is preferably split on one side so that a screw 22 may pass through and tend to close the split which in turn holds the cylinder in any position required.

The flexible roller 14 imparts a resilient action to the film during its travel and provides a substantial factor of safety for it should a momentary hesitation occur on the part of the drums, the roller either moving inwardly or outwardly according to the tension on the film and without this essential feature the film would be liable to break or be otherwise damaged.

The above-mentioned roller 14 is disposed at a tangent to the surface of the drum 3 and in line with this roller is a bracket or bearing 23 having spindles thereon to support rollers 24, 25 and 26 which are adapted to receive the film prior to its journey through the slot 27 in the plate 1.

The film after passing before the projector of the cinema machine is carried by means of the toothed sprocket 28 into a metal case 29 to be returned via a chute 30 through a slot 31 in the plate 1 to be carried by rollers 32 and 33 and 34 mounted on spindles fixed to a suitable bracket 35 which has lugs 36 and $36^a$ cast thereon to accommodate bolts or other suitable means for rigidly fixing the bracket 35 to the base plate 1.

The roller 33 is provided with rubber or pliable bands 37 which are in contact with the surface of the pulley 34 so that when the film is passing between the rollers 33 and 34 there is an even and harmless pressure at all portions of its travel, the pressure being sufficient to carry the film evenly and uniformly the rubber bands 37 making an effective grip for the film between the bands and the lower roller 34 which is provided with a flange 38 having a pin 39 thereon to engage a lug 40 mounted on a flange 41 rigidly secured to a spindle 42 carried in brackets 43 and 44 secured to a plate 45 mounted on the side of the base plate 1.

When the apparatus is started the flywheel 47 moves outwardly on the spindle 42, the flywheel 47 being provided with projecting pins on the inside and outside of the boss the outer pin $47^a$ engaging a pin $47^b$ on the spindle 42.

The spindle 42 is formed between the bearing 43 and 44 with a thread 46 and mounted on this threaded portion 46 of the spindle 42 is a flywheel 47 having a thread in the boss so that the wheel 47 may move freely thereon when occasion arises and particularly when the film breaks or is otherwise damaged.

When this occurs the flywheel 47 moves inwardly and strikes the end 48 of a pivotally mounted arm 49 which is provided with a barb 50 which is engaged when the apparatus is in operation with a barb 51 on a rod 52 having a slot therein to receive the end of a switch arm 53 which is always in tension by being connected to a spring 54 secured to a depending lug 55 on the projection 56 rigidly secured to the switch block 57 which in turn is secured to the plate 58 cast integral with the plate 45, the plate 58 being provided with suitably insulated holes $58^a$ and $58^b$ to receive the leads from the power supply.

To prevent the flywheel from over-travelling and jamming a pin $47^c$ on the inside of the flywheel 47 engages a pin $47^d$ on the threaded spindle 42.

Immediately the flywheel strikes the end 48 of the pivotally mounted arm 49 the barbs 50 and 51 are disengaged and by the action of the spring 54 the rod 52 is withdrawn bringing the switch arm with it and thus cutting off the source of power which stops the whole of the movements of the apparatus.

The roller 33 is preferably pivotally mounted on an arm 59 which is pivotally mounted to the bracket 35 at $35^a$.

Disposed between and connected to the arm 59 and a lug 60 secured to the bracket 35 is a spring 61 which is adapted to keep the roller 33 in constant engagement with the roller 34 although it will be a resilient engagement.

The base plate 1 is formed with a rebate $1^a$ around its entire periphery to accommodate a cover 62 adapted to protect the mechanism.

A frame 63 having horizontal rollers 64, 65, 66, 67 and vertical rollers 68 and 69 is adapted to be placed over the film when same is in position on the drums 3 and $3^a$ the horizontal rollers 64, 65, 66 and 67 riding on the edges of the film and the vertical rollers 68 and 69 being adapted to hold the film and ensure the even travel over the entire course.

The vertical rollers also tend to keep the film from over-riding or bulging which may cause damage in time.

The base plate 1 is preferably mounted on cast legs 70 which would also be adapted to accommodate the various necessary mechanism for cinema displays, the various parts being arranged so that it would result in a self-contained unit capable of severe wear and satisfactory results.

The rollers 10, $10^a$, $10^b$, $10^c$, $10^d$, $10^e$ are provided with lubricators 71, $71^a$, $71^b$, $71^c$, $71^d$, $71^e$ so that the requisite amount of lubricant can be conveyed to the wearing parts when necessary although automatic lubricating means can be employed.

In carrying the invention into practical effect the film is wound on the drums 3 and $3^a$ the inner layer of film being taken from the periphery of drum 3 and on to the roller 24 thence around the roller 24 and back on to the flexibly mounted roller 14 thence back to the roller 26 thence through the slot 27 in the base plate 1 then a safety loop $27^a$ is formed in the film after which it engages the sprocket 28 then past the projector and into the case 29 up along the chute 30 between the rollers 32, 33 and 34 to eventually form the outer layer of film on the drum 3.

I desire it to be understood that the film is wound on edge upon the drums 3 and $3^a$ and where it becomes necessary to pass the film over rollers it is turned so that it becomes at right angles to the film on the drums, the bottom edges of the film riding on the flanged rollers 10, $10^a$, $10^b$, $10^c$, $10^d$, and $10^e$ the frame 63 being placed so that the horizontal rollers ride on the top edges of the film.

What I claim as my invention and desire to secure by Letters Patent is:—

1. Apparatus for the purpose specified, comprising, a supporting base, a front and a rear drum, a flexible roller on the base, top middle and lower rollers disposed in a vertical line and parallel with the flexible roller, the base being slotted with two slots, and two coacting rollers on the base, one of which is rubber covered, and a film disposed on the flat on the drums, the film being directed from the surface of the rear drum, to the top roller, between the top and middle roller to the flexible roller, back to the lower roller, through one slot, to a projecting apparatus, back through the other slot, and between the two coacting rollers, and back from the outer layer on the rear drum, thus being disposed in an endless manner.

2. Apparatus for the purposes specified, comprising, a suitably shaped base plate, front and rear drums mounted thereon and spaced a convenient distance apart and in the same plane, flanged pulleys mounted on the base plate and positioned in frictional contact with the drums, a spindle to which the rear drum is secured, the lower end of the spindle being substantially out of line with the upper end thereof, a grooved driving wheel secured to the spindle below the base plate and connected to any suitable source of power, and vertical extensions on the drums, the extensions being provided with grooves to accommodate a belt for transmitting movement from one drum to the other.

Signed at Melbourne, Victoria, Australia, this 18th day of November 1921.

JOHN ROGER BOW.